C. FORTH.
RAILROAD TICKET MACHINE.
APPLICATION FILED OCT. 31, 1913.

1,320,681.

Patented Nov. 4, 1919.
12 SHEETS—SHEET 5.

Witnesses
H. F. Sadgebury
W. M. McCarthy

Inventor
Charles Forth
by R. Chlass
Chester H. Braselton
Attorneys

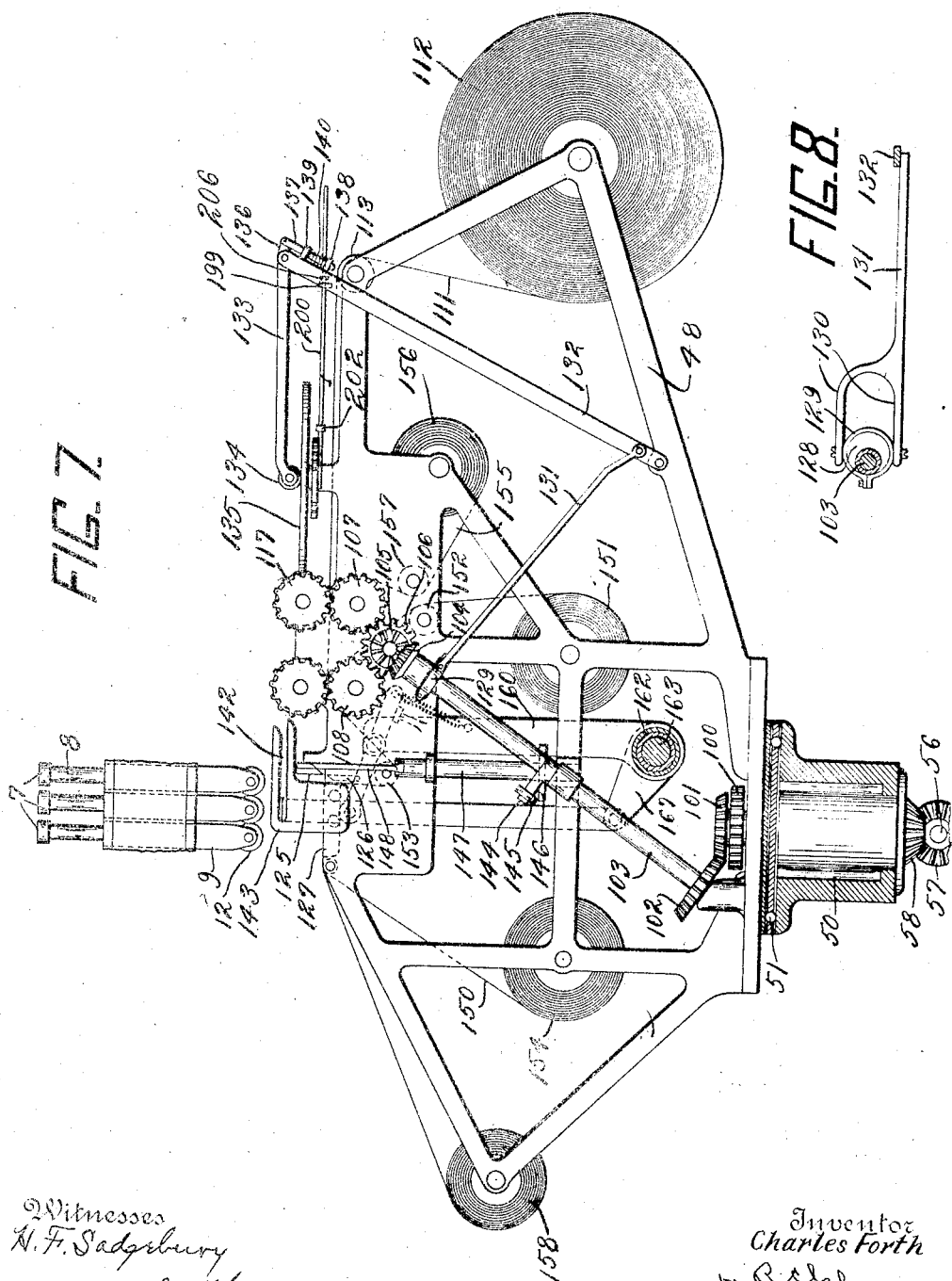

C. FORTH.
RAILROAD TICKET MACHINE.
APPLICATION FILED OCT. 31, 1913.
1,320,681.
Patented Nov. 4, 1919.
12 SHEETS—SHEET 7.
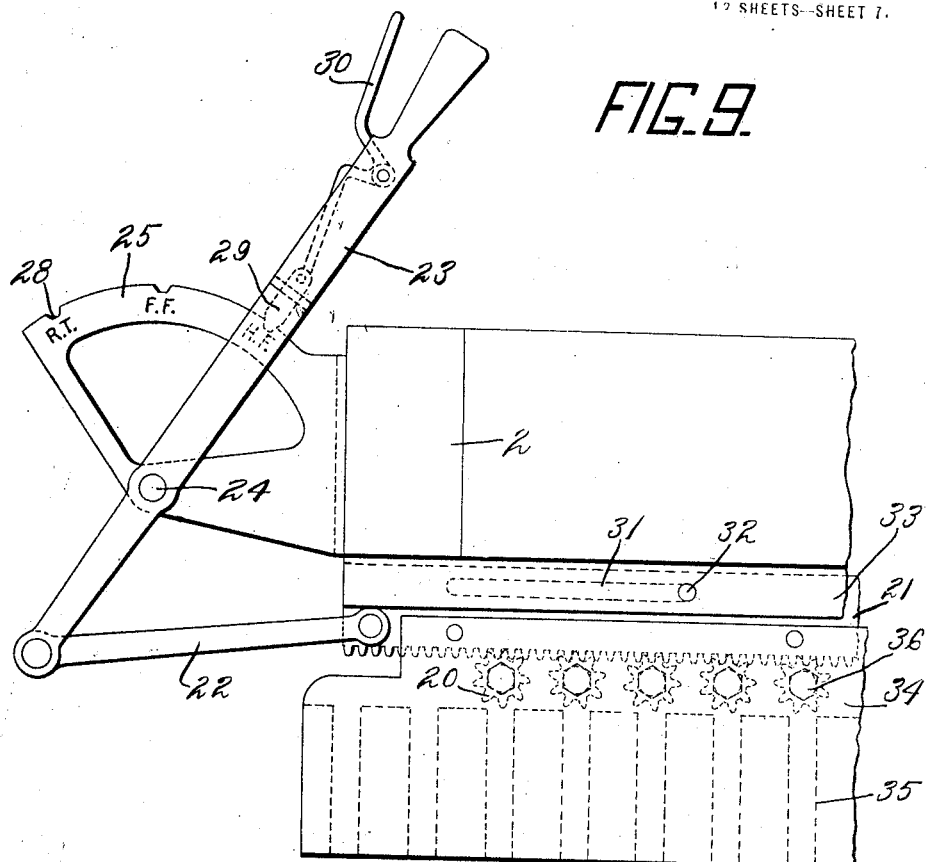
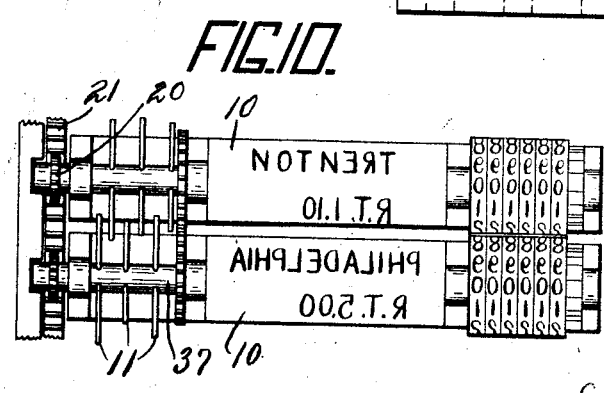
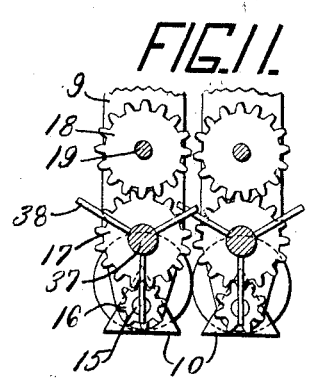
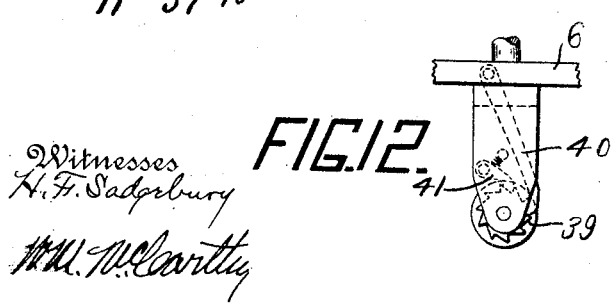
Witnesses
H. F. Sadgebury
W. W. McCarthy
Inventor
Charles Forth
by R. Closs
Chester H. Braselton
Attorneys C. FORTH.
RAILROAD TICKET MACHINE.
APPLICATION FILED OCT. 31, 1913.
1,320,681.
Patented Nov. 4, 1919.
12 SHEETS—SHEET 8.
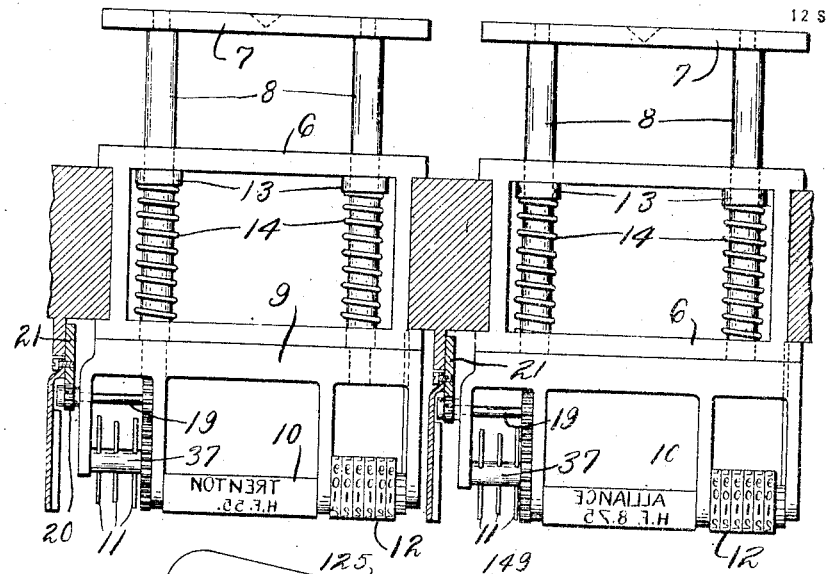
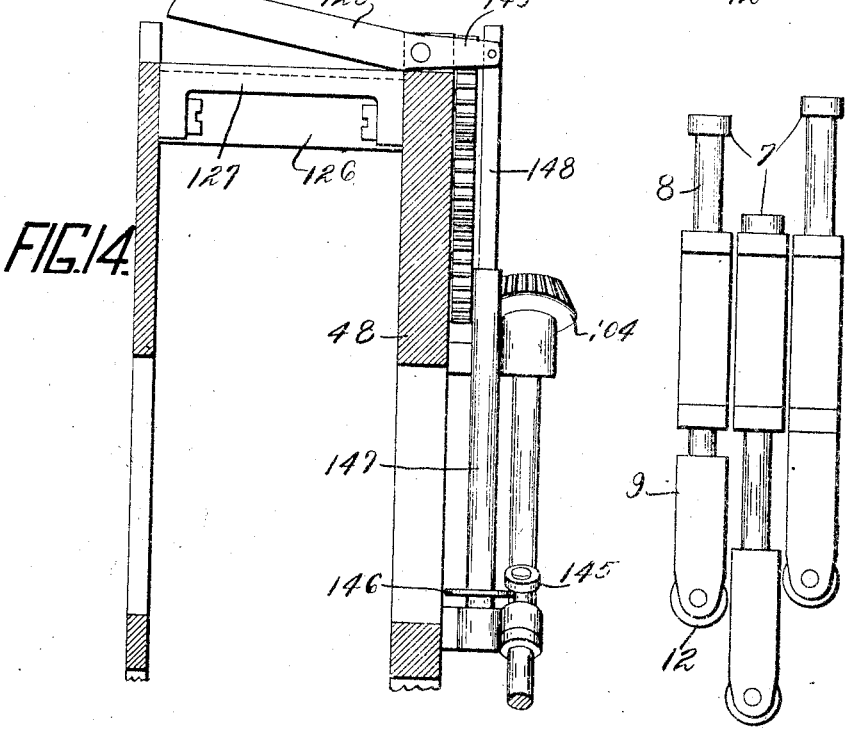

C. FORTH.
RAILROAD TICKET MACHINE.
APPLICATION FILED OCT. 31, 1913.

1,320,681.

Patented Nov. 4, 1919.
12 SHEETS—SHEET 9.

Witnesses
H. F. Sagerbury
W. M. McCarty

Inventor
Charles Forth
by R. C. Sloan
Chester H. Braselton
Attorneys

C. FORTH.
RAILROAD TICKET MACHINE.
APPLICATION FILED OCT. 31, 1913.
1,320,681.
Patented Nov. 4, 1919.
12 SHEETS—SHEET 10.
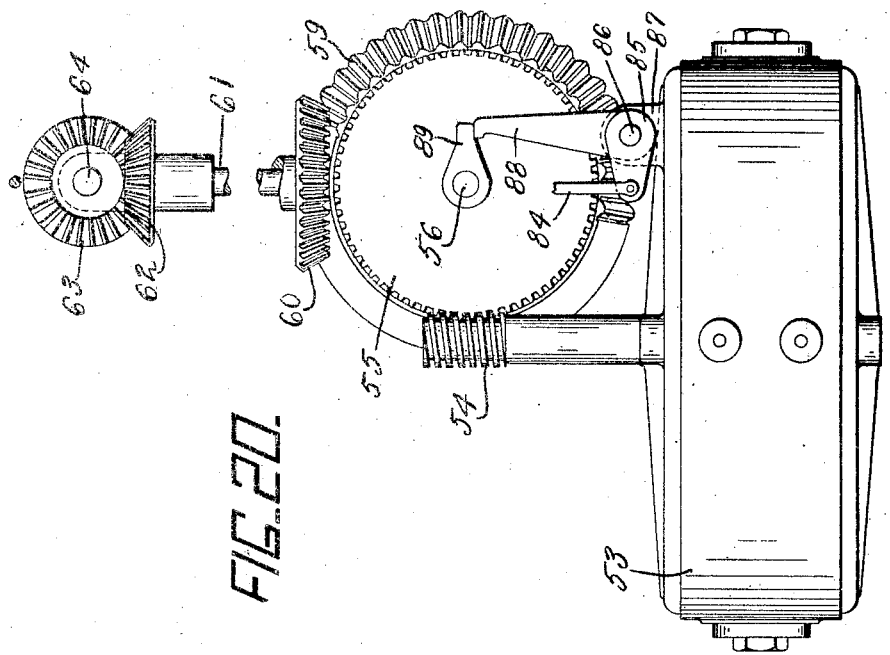
Witnesses
H. F. Sadgebury
W. M. McCarthy
Inventor
Charles Forth
by R. C. Glass
Chester H. Braselton
Attorneys

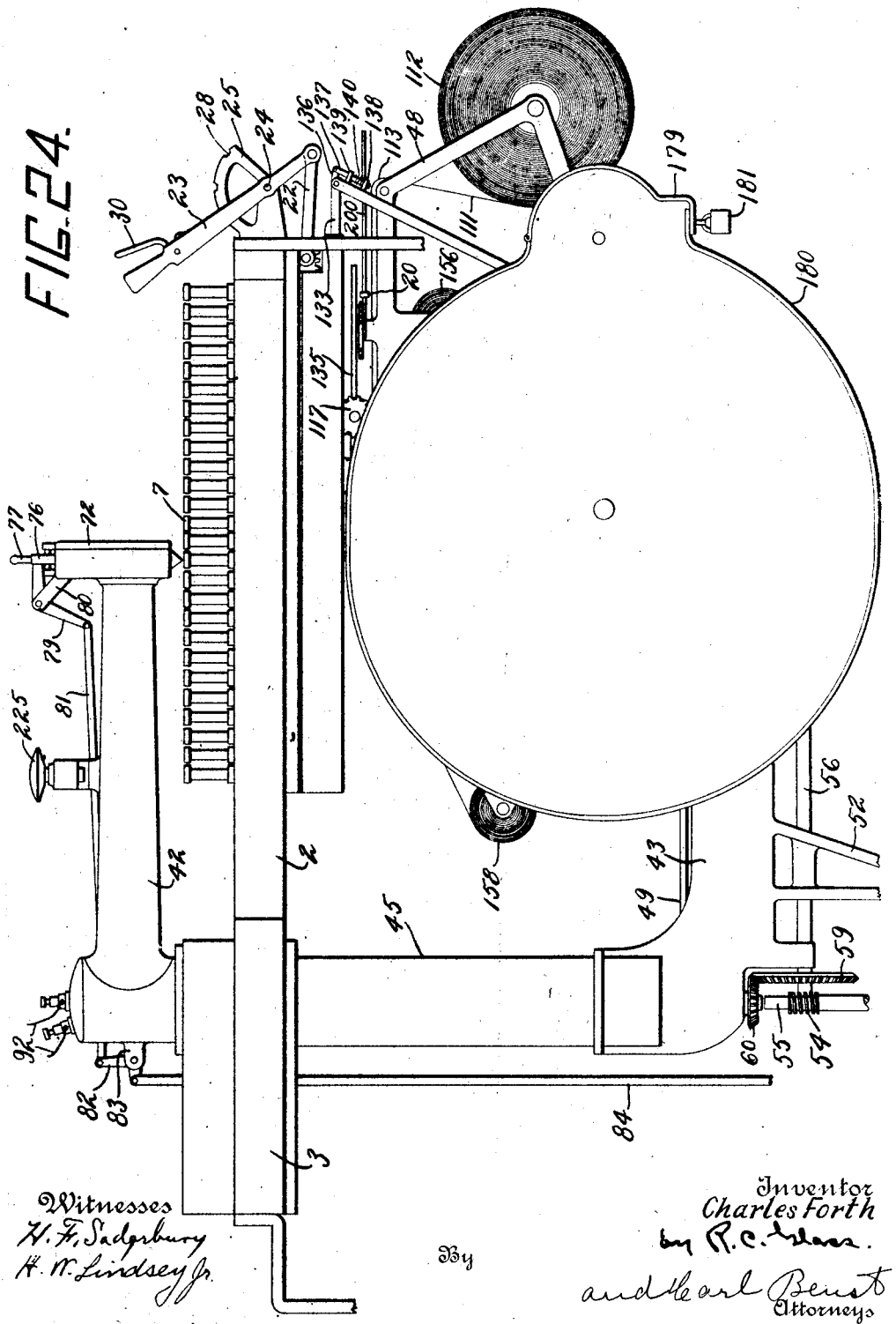

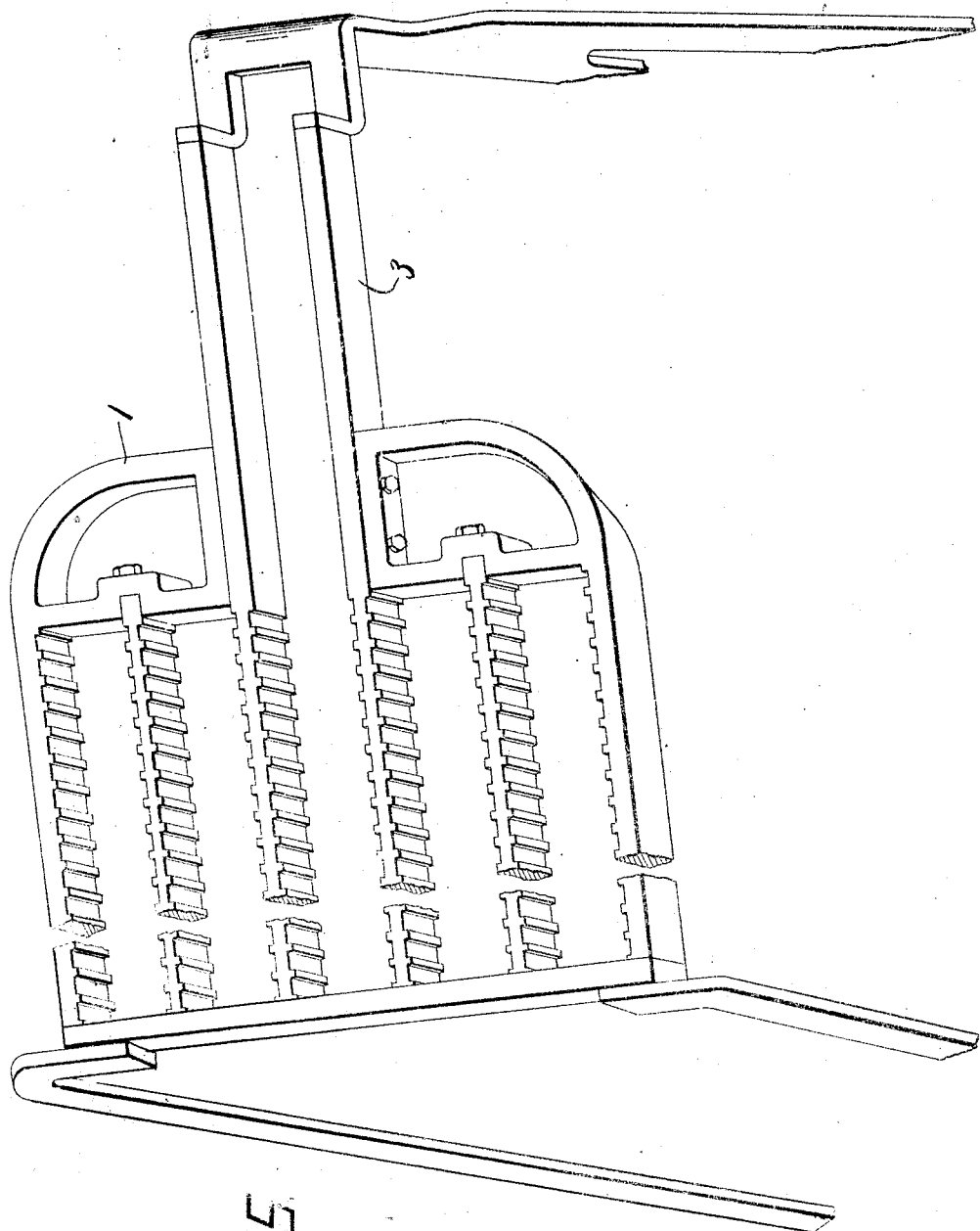

UNITED STATES PATENT OFFICE.

CHARLES FORTH, OF OTTAWA, ONTARIO, CANADA, ASSIGNOR TO THE NATIONAL CASH REGISTER COMPANY, OF DAYTON, OHIO, A CORPORATION OF OHIO. (INCORPORATED IN 1906.)

RAILROAD-TICKET MACHINE.

1,320,681.      Specification of Letters Patent.      Patented Nov. 4, 1919.

Application filed October 31, 1913. Serial No. 798,568.

*To all whom it may concern:*

Be it known that I, CHARLES FORTH, a citizen of the United States, residing at Ottawa, in the county of Carleton and Province of Ontario, Canada, have invented certain new and useful Improvements in Railroad-Ticket Machines, of which I declare the following to be a full, clear, and exact description.

The principal object of this invention is to provide a machine for use by public service corporations, such as railroads, steamships and other transportation lines, which machine is arranged to issue tickets to various destinations traversed by the different lines and automatically accumulate the total of the fares as the tickets are issued and also to record upon a record strip the destination of each ticket issued and the total number of tickets issued to such destination.

Another object of this invention is to provide each destination device with a plurality of stamps for recording upon the ticket strip and the record strip various classes of fares such as half fare, full fare and round trip in addition to the destination. These destination devices are also provided with register controlling means for the different classes of fare so that as the ticket is stamped with the particular class of fare, the registering mechanism will be actuated accordingly. Each of these destination devices is also provided with a numbering device which records upon the ticket strip and the record strip the total number of tickets issued to the destination points represented by the various destination devices.

With these and incidental objects in view, the invention consists in certain novel features of construction and combinations of parts the essential elements of which are set forth in appended claims, and a preferred form of embodiment of which is hereinafter described with reference to the drawings which accompany and form part of this specification.

Of said drawings:—

Fig. 7 is a side elevation of the ticket issuing mechanism.

Fig. 8 is a detail view of the driving connections for the inking mechanism.

Fig. 9 is a partial side elevation of the mechanism for rotating the stamps carried by the destination devices in order to bring any class of fare into position to be stamped upon the ticket.

Fig. 10 is a bottom plan view of two adjacent destination devices.

Fig. 11 is a sectional view through adjacent destination devices showing the amount determining fingers and the gearing for rotating the stamps.

Fig. 12 is a detail view of the operating mechanism for the consecutive numbering device carried by each destination device.

Fig. 13 is a partial sectional view through the stationary frame carrying the destination devices and showing two of such devices.

Fig. 14 is a sectional view illustrating the operating mechanism for the ticket severing mechanism.

Fig. 15 is a detail view of three adjacent destination devices showing the same in normal position, partially operated position and completely operated position.

Fig. 20 is a detail view of the motor and connected gearing for actuating the operated mechanism of the machine.

Fig. 21 is a plan view of part of the record strip.

Figs. 22 and 23 are front and back views respectively of an issued ticket.

Fig. 24 is a side elevation of the complete machine.

Fig. 25 is a detail perspective view (partly broken out) of the destination device supporting frame.

Figure 1:
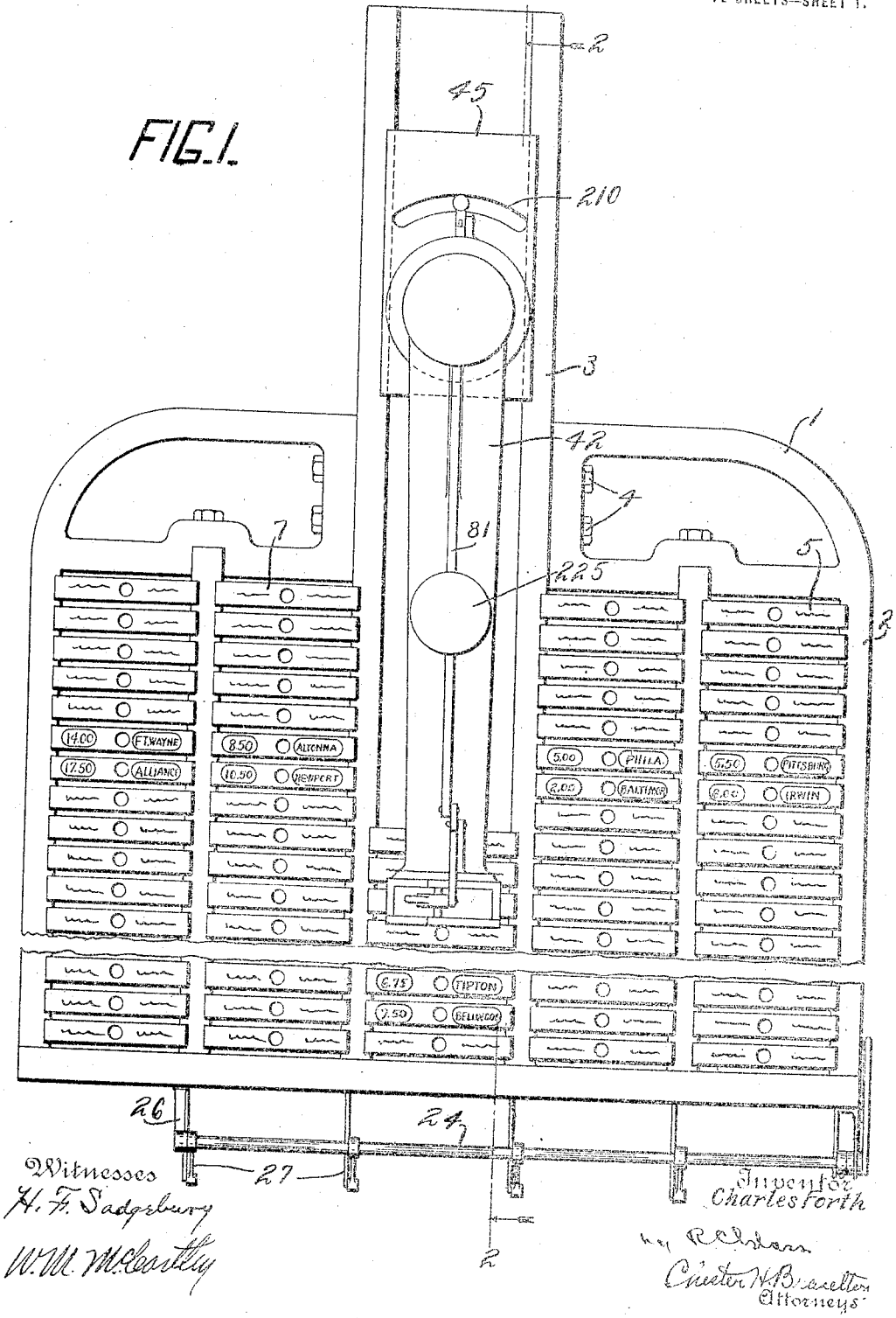
Figure 1 is a top plan view of the improved machine.

Described in general terms the machine comprises a stationary frame having a plurality of parallel rows of vertically movable destination devices mounted therein. Each of these destination devices is provided with a triangularly shaped stamp, each side of which bears a different class of fare to be stamped upon the ticket, such for instance as half fare, full fare and round trip. Each of these devices is also provided with a register actuating means for each stamp so that as its stamp is brought into position to stamp the destination and class of fare upon the ticket, the corresponding register actuating means will be brought into position to actuate the registering mechanism an extent corresponding to the amount of fare represented by the selected class of fare. Each of these devices is also provided with a consecutive numbering stamp which records upon a ticket strip and a record strip the total number of times that each one of the destination devices is operated. A pivotal and reciprocatory frame is mounted in the stationary frame having two arms, one of which traverses the upper edges of the different parallel rows of destination devices in order to select any one of said devices, while the other arm is located below the destination devices and carries a ticket issuing mechanism and a registering mechanism, which is aranged to be brought into coöperative relation with the destination device selected by the upper arm of said frame. The ticket issuing and registering mechanisms are pivotally mounted upon the lower arm of the movable frame and connected by parallel links to a portion of the movable frame which is reciprocated but not rotated so that as the frame is rotated to select different destination devices in the various rows of destination devices the ticket issuing and registering mechanism will be maintained in the same plane as the row of destination devices in which any one of said devices is selected. This ticket issuing mechanism comprises a ticket strip which is fed by an operating mechanism to a platen below the selected destination device and also severing mechanism for severing the strip after the class of fare and the destination to which the ticket is issued has been stamped thereon. This ticket issuing mechanism is also provided with a roll for inking suitable electroplates carried by the feed rollers and also for inking the selected destination device. The arm of the movable frame for selecting the destination device to be operated is provided with an eccentric which when rotated partially depresses the selected destination device and also turns on the current to the motor. The selected destination device will be momentarily held in its partially operated position, while the mechanism driven by the motor will actuate the inking mechanism to ink the previously mentioned electroplates carried by the feed rollers for the ticket strip and also for inking the partially operated destination device after which the operating mechanism will completely operate the selected destination device. The ticket issuing mechanism also comprises a record strip upon which is stamped through an inking ribbon interposed between the ticket strip and record strip the same information as is recorded upon the ticket strip. For each class of fare stamped upon the ticket and record strip, the registering mechanism is actuated an extent corresponding to the fare represented by the destination device used.

A stationary frame 1 comprising end plates 2 and intermediate plates 3, the said end plates and intermediate plates being secured together by bolts 4, has mounted therein a plurality of parallel rows of destination devices 5. These destination devices 5 are movably mounted in frames 6 (Fig. 13) supported by end plates 2 and intermediate plates 3 of the stationary frame 1. Each destination device is provided with an upper plate 7 (Figs. 1, 2 and 13) upon which plate is inscribed the destination point represented thereby and the full fare thereto. Projecting downwardly from this plate 7 are two rods 8 which extend through the plates 6 and at their lower ends have secured thereto a frame 9, in which is mounted a stamp 10, register actuating means 11 and a consecutive numbering device 12. Rods 8 have secured thereto collars 13 which normally are held in contact with the upper cross bar of the frame 6 by coiled springs 14 which surround the rods 8 and have the ends thereof abutting against the collars 13 and the lower cross bar of the frame 6. The stamp 10 of each destination device is triangular in shape (Fig. 11) upon the sides of which are engraved the destination, amount of fare thereto and the class of fare; such as half fare, full fare and round trip. Each of these stamps is supported by bearings 15 in the frame 9, the outer end of one of said bearings being provided with a pinion 16 which meshes with a pinion 17 supported on the frame 9 of the destination device, the latter pinion in turn meshing with a similar pinion 18 which is secured to the inner end of a short shaft 19 supported by the frame 9. The outer end of this shaft 19 is provided with a pinion 20, (Figs. 9 and 10) which meshes with a rack 21, which rack engages with the pinions 20 of all of the destination devices of that particular row, it being understood that for each row of destination devices there is a similar rack 21 and intermediate connections between the various stamps of that particular row, all of said racks being simultaneously moved to set up the different classes of fares upon the stamps 10. Connected to one of the racks 21 is a link 22 (Fig. 9), the other end of which link is connected to a lever 23 which at an intermediate point is secured to a rod 24. One end of this rod is mounted in a plate 25 secured to the front end plate 2 of the stationary frame 1 and at its other end is supported by a bracket 26 (Fig. 1) also secured to the front end plate 2 of the stationary frame 1. Each rack 21 of the other rows of destination devices is connected by a similar link 22 to arms 27 secured to the shaft 24, by which construction it will be obvious that as the shaft 24 is rocked by an operation of the lever 23, the racks 21 of the different rows of destination devices will be moved and through the previously described connections with the stamps 10 rotate said stamps to bring one of the faces thereof in position to stamp upon the ticket strip of the ticket issuing mechanism the destination, the class of fare and the amount of fare to such destination.

The plate 25 (Fig. 9) is provided with notches 28 in which a plunger 29 carried by the lever 23 enters to prevent any accidental displacement of said levers 23 and 27 and the destination stamps 10 controlled thereby. When it is desired to rotate the stamps 10 to bring a different class of fare in position to stamp upon the ticket strip, a lever 30 carried by the lever 23 is operated which withdraws the plunger 29 from engagement with one of the notches 28 of the plate 25 and the lever 23 is then rocked to bring the desired class of fare of the different stamps in position to record upon the ticket strip of the ticket issuing mechanism, the plunger 29 entering the notch 28 of the plate 25 when the desired class is brought into printing position, the plate 25 having inscribed thereon beneath the notches 28 abbreviations indicating the different class of fares. The racks 21 are provided with elongated slots 31 into which extend studs 32 projecting from flanges 33 formed on the underside of the stationary frame 1. Secured to each of the racks 21 is a plate 34 provided with ribs 35, between which ribs the hexagon heads 36 of the shafts 19 of the various destination devices pass when any of the destination devices is operated and thereby positively prevents movement of the adjusting lever 23 and the stamps 10 controlled thereby during the operation of any one of the destination devices. The pinion 17 of each destination device (Fig. 11) is secured to a shaft 37, which is supported by the frame 9 and projecting radially from this shaft are three sets of amount determining fingers 11 graduated to represent the different prices to be printed on the tickets.

When the selected destination device is operated, as hereinafter described, the fingers 11 actuate the registering mechanism an extent corresponding to the class of fare in position to be stamped upon the ticket strip, it being understood that the appropriate set of fingers 11 is brought into coöperative relation with the registering mechanism at the time the stamp is adjusted to stamp the class of fare and destination upon the ticket strip. Each destination device is also provided with a consecutive numbering device 12, as previously stated, the units wheel of which is advanced one step upon every operation of the destination device carrying said numbering device. This units wheel, as shown in Figs. 12 and 13 is provided with a ratchet wheel 39, with which a feed pawl 40 carried by the lower cross bar of the frame 6 coöperates as the selected destination device is reciprocated. This reciprocation of the selected device causes pawl 41 to advance the units wheel through its ratchet 39 one step, said units wheel being held in its advanced position by a retaining pawl, 41, it being understood that a suitable transfer mechanism (not shown) is provided between the several wheels of the numbering device.

Figure 2:
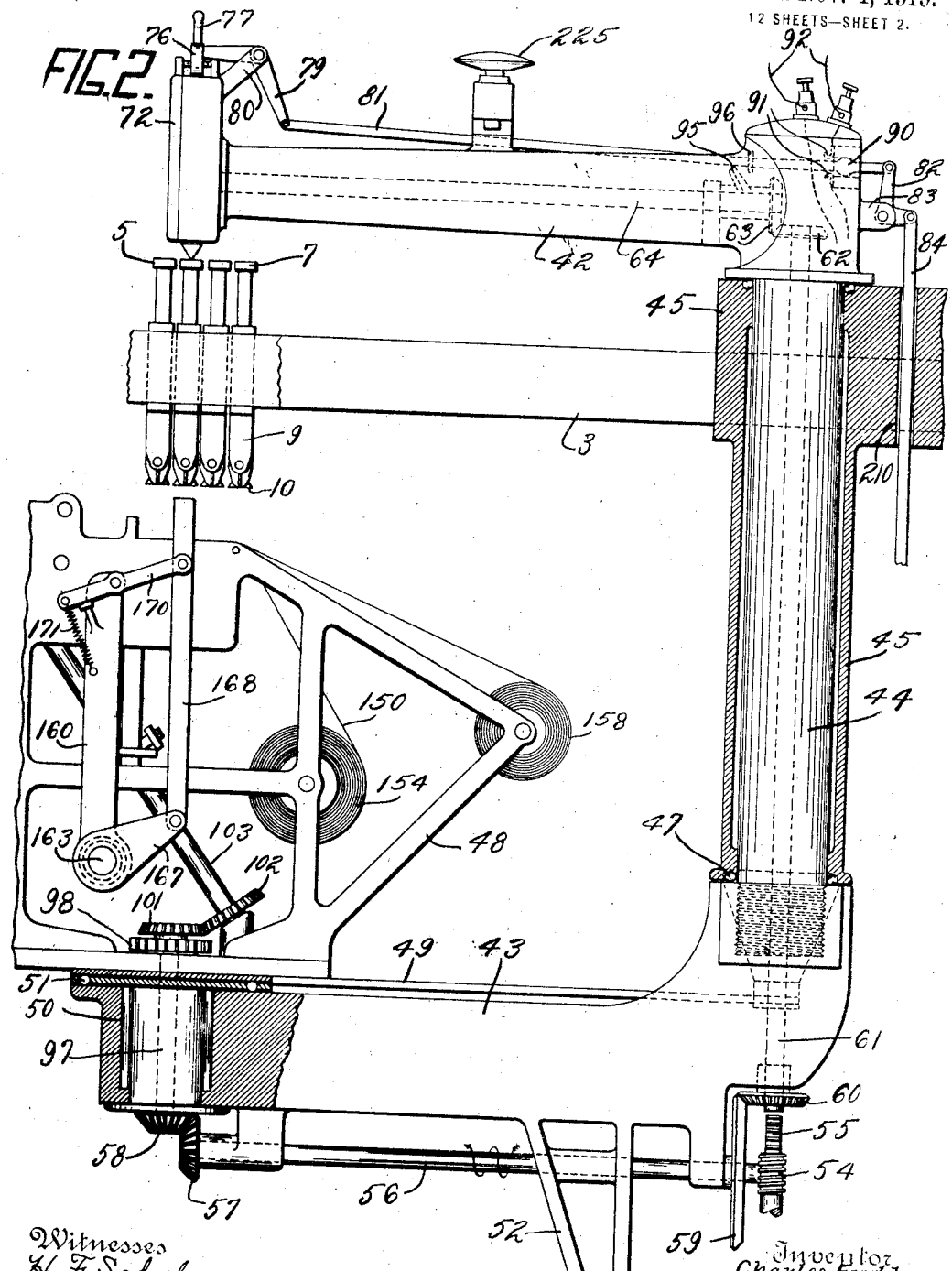
Fig. 2 is a sectional view on line 2—2, of Fig. 1.
Figure 3:
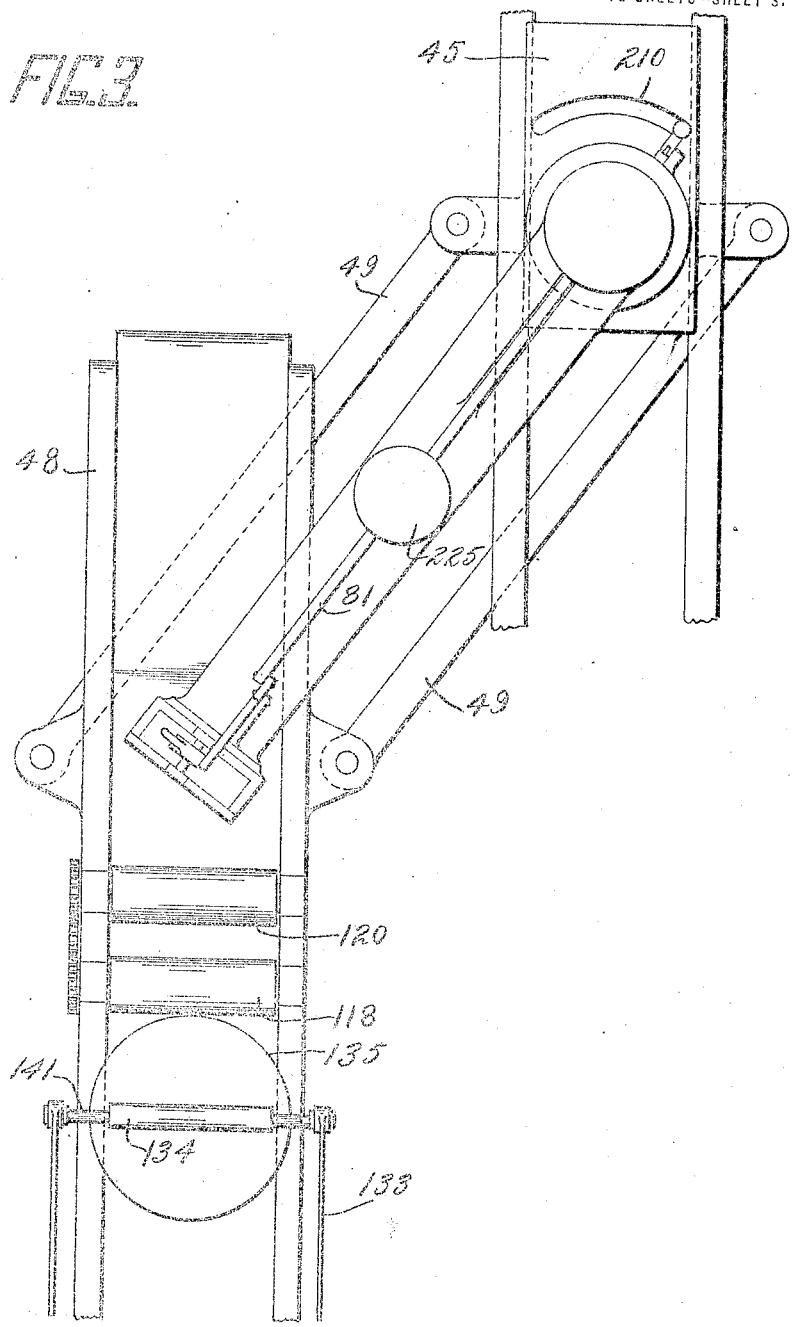
Fig. 3 is a top plan view of the movable frame carrying the ticket issuing mechanism.

A movable frame comprising an upper selecting arm 42, (Fig. 2), which traverses the head plates 7 of the destination devices 5 and an arm 43 carrying the registering and ticket issuing mechanism, hereinafter described, is mounted upon the stationary frame 1, said arms being connected by a tubular shaft 44. A frame 45 surrounds the tubular shaft 44 and is supported upon the intermediate frames 3 as shown in Fig. 1 of the stationary frame 1. The frame 45 at its upper and lower ends is provided with seats for roller bearings 47 to reduce the friction between the swinging arms 42 and 43 and the frame 45. For the purpose of assembling the frame 45 is split at its upper end so that it may be easily mounted within the intermediate plates 3 of the stationary frame 1, the different sections being pinned together so as to move as a unit. An oscillatory frame 48 is mounted upon the outer end of the lower arm 43, in which frame is mounted the ticket issuing and registering mechanisms hereinafter described. This frame is connected by links 49 to the frame 45, as shown in Fig. 3, so that when the arm 42 is rotated within the frame 45 in passing from one row of destination devices to another, the frame 48 carrying the ticket issuing and registering mechanism will be held in the same plane as the row of destination devices in which the selected device is located. From this it will appear that the frame 45 of the arms 42 and 43 may be moved bodily back and forth within the intermediate plates 3 of the stationary frame 1 so as to bring the selecting arm 42 into coöperative relation with any one of the destination devices in any particular row and also that the arms 42 and 43 may be rotated within the frame 45, so as to select any one of the destination devices in any row. This rotation of the arms 42 and 43 will move the oscillatory frame 48 carrying the ticket issuing and registering mechanism therewith but through the parallel links will cause the frame 48 to always remain parallel to the frame 45 in which the arms 42 and 43 are rotatively mounted. The frame 48 is supported upon the arm 43 by roller and ball bearings 50 and 51, respectively, so as to reduce the friction between the arm 43 and said frame 48.

Figure 16:
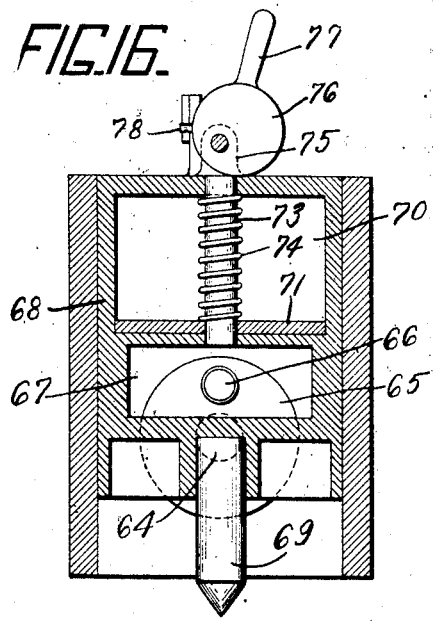
Fig. 16 is a sectional view through the head of the arm carrying the actuating plunger for the destination devices.
Figure 17:
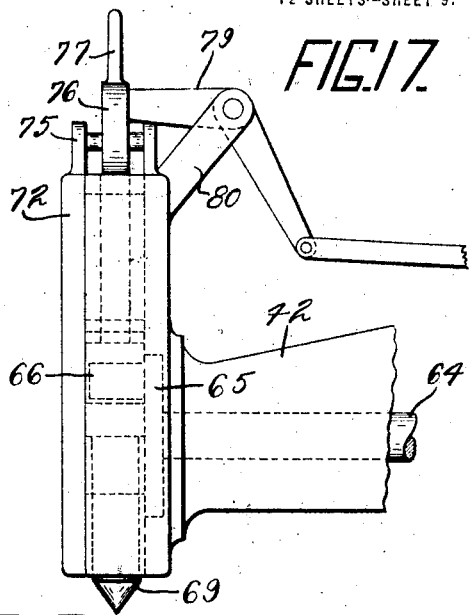
Fig. 17 is a side elevation of the mechanism shown in Fig. 16.

The arm 43 has an extension 52 (Fig. 2) projecting downwardly therefrom in which extension is mounted a motor 53 (Fig. 20). The armature shaft of this motor is provided with a worm 54 (Figs. 2 and 20) which worm engages with a worm gear 55 secured near the rearward end of a shaft 56 supported by the arm 43. This shaft at its forward end has secured thereto a bevel pinion 57 which meshes with a similar pinion 58 forming a part of the driving means for the ticket issuing mechanism hereinafter described. Also secured to the shaft 56 is a mutilated beveled gear 59 which drives a bevel gear 60 secured to the lower end of a vertical shaft 61 extending upwardly through the tubular shaft 44 and provided at its upper end with a beveled gear 62 which meshes with a similar gear 63 secured to a shaft 64 suitably supported within the arm 42 of the movable frame. The shaft 64 at its forward end (Figs. 16 and 17) has secured thereto a disk 65, from which projects a roller 66 near the outer edge of said disk. This roller extends into an opening 67 formed in a plunger frame 68 which frame carries a rod 69, which rod is arranged to coöperate with the selected destination device. The plunger frame 68 is further provided with another opening 70 into which projects a cross plate 71 carried by the head 72 of the arm 42. A rod 73 carried by the plunger frame extends through the opening 70 in said frame and has a coiled spring 74 surrounding it, the ends of which spring abut against the upper cross bar of the plunger frame 68 and the cross rod 71 of the head 72, thereby normally holding the plunger frame 68 in its uppermost position, as shown in Figs. 2, 16 and 17.

Extending upwardly from the head 72 are projections 75 in which there is eccentrically mounted a disk 76. This disk is provided with a lever 77, which, when the arm 42 is brought into coöperative relation with the desired destination device 5, is rotated in a clockwise direction (Fig. 16) and being eccentrically mounted will cam the plunger frame 68 downwardly against the tension of its spring 64, and through the rod 69 carried by said frame partially operate the selected destination device 5. The eccentric disk 76 has extending from the surface thereof a stud 78 which extends into a recess formed in the forward end of the horizontal member of a bell crank lever 79 which is pivoted upon an arm 80 extending from the head 72 of the arm 42. The vertical member of the bell crank 79 is connected at its lower end to the forward end of a link 81 (Fig. 2) which link is connected to a bell crank 82 supported by an ear 83 projecting from the hub of the arm 42. The horizontal member of the bell crank 82 is connected by a link 84 to an arm 85, (Fig. 20), secured to a stub shaft 86 supported by a bracket 87 extending upwardly from the frame of the motor 53. Secured also to this stub shaft 86 is an upwardly extending arm 88 which normally engages with an arm 89 secured to the outer end of the shaft 56 and thereby prevents accidental rotation of said shaft. The link 81 (Fig. 2) near its rear end is provided with an enlarged portion 90 which as said link is drawn forwardly engages contact plates 91 suitably mounted in the hub of the arm 42 and thereby closes a circuit through the wires 92 from a suitable source of electric energy (not shown) to the motor 53. This link 81 is drawn forwardly by the rotation of the eccentrically mounted disk 76 in a clockwise direction, which movement of the disk 76 causes the bell crank 79 also to be rocked in a clockwise direction, thereby drawing the link 81 forwardly. Just prior to the closing of the circuit, as above described, or simultaneously therewith, the bell crank 82 (Fig. 2) will be rocked in an anti-clockwise direction, thereby elevating the rod 84 and through the rod 86 rock the arm 88 from engagement with the arm 89 secured to the shaft 56, thereby permitting said shaft to be rotated through the worm 54 and worm gear 55. The frame 45 is provided with an elongated slot 210 through which the rod 84 extends. This slot enables the arm 42 of the movable frame to be swung to the various rows of destination devices in order to select any desired device, during which movement of the arm 42 the rod 84 will play in the elongated slot 210.

Owing to the mutilated portion of the gear 59 first passing the bevel gear 60, the latter will not be rotated during the first half rotation of the shaft 56 but during the last half rotation of said shaft the teeth of the bevel gear 59 will engage with the teeth of the gear 60 and rotate said gear and shaft 61 to which it is secured, there being sufficient teeth on the mutilated gear 59 to impart a complete rotation to the gear 60 and the shaft 61. This rotation of the shaft 61 will, through the bevel gear 62 and 63, impart a complete rotation to the shaft 64 (Figs. 2, 16 and 17) and through the rotation of this latter shaft the roller 66 carried by the disk 65 will engage the lower wall of the recess 67 formed in the plunger frame 68 and fully depress said frame against the tension of its springs 74. By this movement of the frame the plunger rod 69 carried thereby will completely depress the selected destination device 5 so that the latter will stamp upon the ticket strip and the record strip the class of fare, the destination to which it is issued and the price thereof, as well as actuate the registering mechanism. After this is accomplished the spring 73 returns the plunger frame to its normal position, as shown in Figs. 2, 16 and 17, while the springs 14 of the operated destination device will return said device to its normal position. The hub of the gear 63 secured to the shaft 64 is provided with a flange 95, which near the end of the rotation of the shaft 64 will engage with a collar 96 secured to the link 81 and cam said link rearwardly, thereby breaking the circuit to the motor and restoring the pawl 88 (Fig. 20) in position to engage the arm 89 and thereby arrest the shaft 56 at the end of its rotation.

As the arm 42 is swung from one row of destination devices to another, the bevel pinion 63 secured to the shaft 64 mounted in said arm will slightly rotate about the bevel pinion 62 and thereby cause a slight rotation of the shaft 64 and to provide for this the recess 67 formed on the plunger frame 68, (Fig. 16), is of much greater diameter than the diameter of the roller 66 carried by the disk 65 which is secured to the shaft so that any rotation of the shaft caused by the swinging of the arm 42 will in no way affect the plunger frame 68. The shaft 61 carrying the bevel pinions 60 and 62 is locked from rotation as the arms 42 and 43 are rotated by the locking surface of the mutilated gear 59 carried by the lower arms 43 engaging with the teeth of the bevel pinion 60. As there is no relative movement between the worm 54 and the worm gear 55 because of the fact that both are moved with the lower arm 43, there will be no rotation of the shaft 56 carrying the worm gear 55 but a slight rotation will be imparted to the bevel pinion 58 by the bevel pinion 57 secured to the shaft 56 but no harm will be done thereby because of the fact that said pinion 58 is free to turn.

As previously stated, during the first half rotation of the shaft 56, the operating mechanism for the destination devices is not operated and during this period of rotation of the shaft 56 the inking mechanism forming a part of the ticket issuing mechanism is operated to ink the feed rollers and the partially operated destination device, after which the ticket strip is fed in position to receive an impression from the destination device when the same is completely operated which occurs during the latter part of the rotation of the shaft 56.

Figure 18:
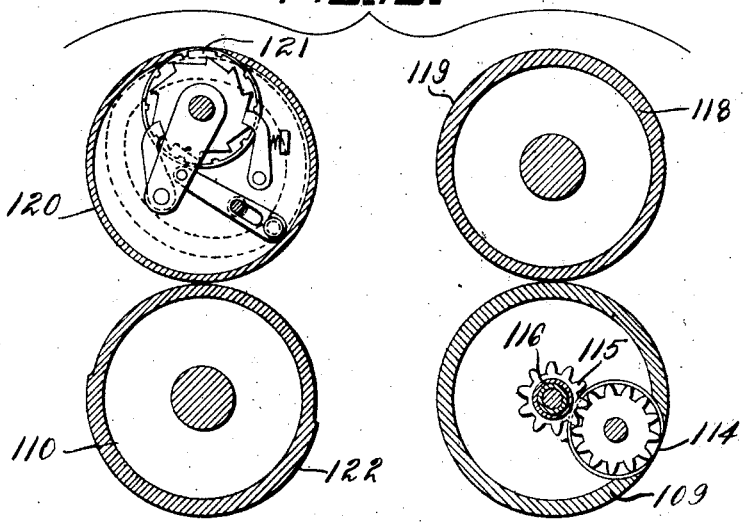
Fig. 18 is a sectional view of the feed rollers for the ticket strip.
Figure 19:
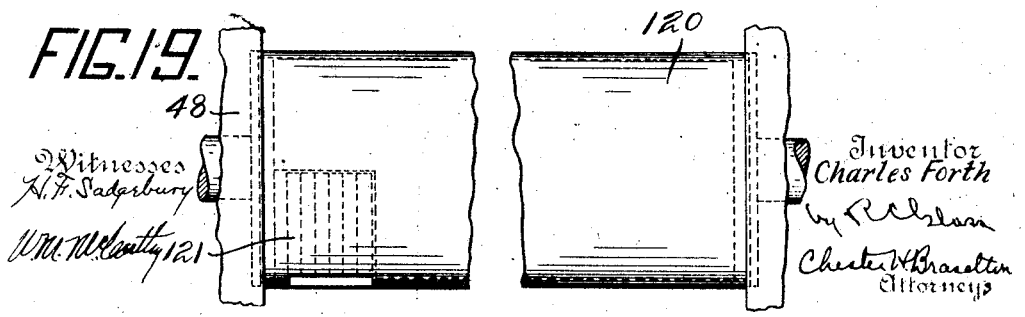
Fig. 19 is a detail view of one of the feed rollers.

Referring to Figs. 2 and 7, it will be seen that the bevel gear 58 is secured to a rod 97, (Fig. 2), extending upwardly through the forward end of the arm 43 and to the upper end of which rod is secured gear 98 which meshes with a gear 100, (Fig. 7). To this gear 100 is secured a bevel gear 101 which meshes with a similar gear 102 secured to the lower end of an inclined shaft 103 supported in the auxiliary frame 48. At its upper end this inclined shaft 103 is provided with a bevel gear 104 which meshes with a similar gear 105 having fast thereto a pinion 106, this pinion meshing with pinions 107 and 108 secured to the lower ones 109 and 110, respectively, of two pair of feed rolls for the ticket strip 111, which strip is stored upon a supply roll 112 suitably mounted in the auxiliary frame 48 and is fed over an idler 113 to the two sets of feed rollers. The lower feed roller 109 (Fig. 18) is provided with type wheels 114 for printing the date, which type wheels are set up through suitable pinions 115 and sleeve connections 116, the latter extending to the outside of the feed roller as is well known in the art. This roller is also provided with a suitable electroplate for printing the issuing station where the machine is located upon the back of the ticket strip, as shown in Fig. 23. The pinion 107 (Fig. 7) of the lower feed roll 109 meshes with a similar pinion 117 which is connected to the feed roller 118. It will be noted by reference to Fig. 18, that the feed roller 118 is provided with an enlarged portion 119 which at an intermediate period of rotation of the rolls 109 and 118 engages the ticket strip therebetween and causes said strip to be fed during this period. The roller 118 is provided with a suitable electroplate for printing certain data upon the face of the ticket as shown in Fig. 22. A roller 120 is provided with a grand total consecutive numbering device as shown in Fig. 22 of the drawings for printing upon the face of the ticket. This consecutive numbering device 121 represents the grand total of tickets issued by the issuing machine, as shown at 123 (Fig. 22), while the consecutive numbering device carried by the destination device records the number of tickets issued to that destination, as shown at 124 in Fig. 22. The roller 110 which coöperates with the roller 120 has an enlarged portion 122, which during the rotation of said rollers grips the check strip at the same time as the check strip is gripped by the enlarged portion 119 of the roller 118 and the roller 109 thereby assists in the feed of the ticket strip. The ticket strip passes from the rolls 110 and 120 between knives 125 and 126 on to a platen 127 supported by the oscillatory frame 48 where said strip is stamped by the operated destination device. While the selected destination device is in partially operated position an inking mechanism is operated to ink the electroplate upon the roller 119 and the consecutive numbering type carriers 121 carried by the roller 120 and also to ink the partially operated destination device, which inking mechanism is operated as follows.

Figure 6:
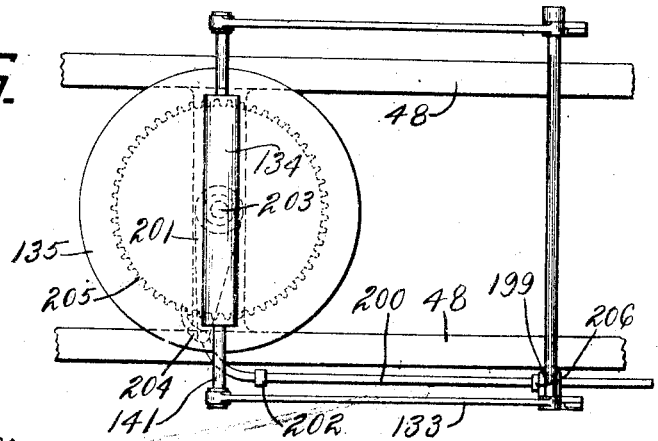
Fig. 6 is a top plan view of the inking mechanism for the ticket issuing devices.

The inclined shaft 103 (Fig. 8) has secured thereto an eccentric disk 128 surrounding which is a collar 129 the latter being secured to prongs 130 of a link 131 which link at its other end is connected to one of a pair of arms 132 pivoted upon the auxiliary frame 48. The upper ends of arms 132 are connected to side arms 133 carrying an ink roll 134, which roll plays upon a disk 135 carrying a supply of ink. The arms 133 have rearward extensions 136 to which are pivoted links 137 extending through lugs 138 projecting from the arms 132. Each link 137 has a collar 139 between which and the lug 138 a spring 140 is interposed, so as to normally hold the roller 134 carried by the arms 133 into contact with the ink supply disk 135. Immediately upon the beginning of rotation of the shaft 103, the eccentric disk 128 secured thereto will draw the link 131 to the left (Fig. 7) and thereby rock the arms 132 in a counter clockwise direction as viewed in this figure, which will cause the arms 133 carrying the roll 134 to pass over the disk 135 and over the feed roller 118 and 120 and to the partially operated destination device. As the ink roll 134 passes beyond the feed roll 120 the supporting rod 141 of said roll will then enter into an elongated slot 142 formed in a bracket 143 secured to the auxiliary frame 48 and thereby hold said roll in position to ink the partially operated destination device against the tension of the springs 140. Before the partially operated destination device is started by the operating mechanism to stamp the ticket, the ink roll 134 is withdrawn so as not to interfere with the operation of the selected destination device. One of the arms 132, Figs. 6 and 7, has a stud 199 projecting therefrom through which extends one end of a rod 200, the other end of said rod being connected to an arm 201 pivotally mounted upon a stud 203 extending upwardly from a cross bar of the auxiliary frame 48. The arm 201 carries a pawl 204 which engages a gear wheel 205 rotatably mounted upon the stud 203 and connected to the disk 135. The rod 200 is provided with a collar 202 with which the stud 199 will contact as the arms 132 are rocked in a counter clockwise direction Fig. 7, through the connections with the inclined shaft 103. This stud 199 carried by one of the arms 132 will ride idly upon the rod 200 until it contacts with the collar 202 and as the arm 132 carrying the stud 199 continues its movement in a counter clockwise direction it will through collar 202 secured to the rod 200 move said rod, and through the pawl 204 partially rotate the gear 205 and the disk 135 connected thereto to bring a fresh supply of ink in path of the roller 134. As the arms 132 carrying the frame supporting the ink roll 134 receive a greater throw to bring the roller into contact with the partially operated destination device than is necessary partially to rotate the inking disk 135 the latter is not rotated until near the end of movement at the arms 132 in a counter clockwise direction when the stud 199 will contact with the collar 202 secured to the rod 200 and through the pawl 204 partially rotate the gear 205 and the disk 135. As the arms 132 are returned toward normal position the stud 199 carried by one of the arms 132 will contact with a collar 206 secured to the rod 200 and return said rod and parts connected therewith to normal position.

After the partially operated destination device is completely operated to stamp the ticket, the mechanism for severing the stamped ticket will be brought into play. This mechanism is operated as follows. Secured to the shaft 103 intermediate its ends (Fig. 7) is an arm 144 which carries a roller 145, which near the end of rotation of the shaft 103 engages the under side of a disk 146 (Figs. 7 and 14) and elevates said disk. This disk 146 is secured to a rod 147 suitably secured to the auxiliary framework 48 and at its upper end is connected to the lower end of a link 148, the other end of which is connected to an extension 149 of the movable knife 125. By reference to Fig. 14 it will be seen that as the disk 146 is elevated, the rod 147 and link 148 will also be elevated, thereby rocking the knife 125 in an anti-clockwise direction to sever the portion of the ticket that has been stamped by the operated destination device from the remainder of the ticket strip 111. After the ticket is severed the arm 42 is swung to either the left of the right hand row of destination devices, if it has been in coöperative relation with any of the intermediate rows of destination devices 45, by which movement the ticket issuing mechanism will also be brought into position so that the severed ticket may be readily removed by the attendant.

The information recorded upon the ticket strip by the various destination devices operated is also recorded upon a record strip 150 which is fed from a supply roll 151 over a guide roll 152 between the feed rollers 110 and 120 around a guide roll 153 supported by the frame 48 and thence up over the platen 127 from whence it is led to a storage roll 154. A suitable inking ribbon 155 is led from a storage roll 156 mounted in the frame 48, around a guide roll 157, between the feed rolls 109 and 118, by which ribbon the date and issuing are printed upon the back of the check strip as indicated in Fig. 23. This ribbon is then fed between the feed rollers 110 and 120, around guide roll 153 and over the platen 157 to a storage roll 158 suitably mounted in the oscillatory frame work 48. Suitable winding devices, not shown, may be provided for winding the record strip 150 upon its storage roll 154 and the ribbon 155 upon its storage roll 158, which winding mechanism could be driven from the shaft 103 to take up the amount of feed imparted to the record strip 150 and the ribbon 155 by the rolls 110 and 120. This winding mechanism may be of any well known form and as such devices are well understood in the art, it is thought there is no need of showing any particular form of mechanism. The auditor in checking a station where one or more machines are in use detaches that portion of the record strip or strips having data recorded thereon from the remainder of the strip or strips and place the detached strip or strips beneath a hand stamp 225 carried by the arm 42 to have stamped thereon the number of the machine from which the strip has been removed, Fig. 21, thus avoiding any possible confusion as to the machine from which any particular record strip was removed.

As before stated, the auxiliary frame 48 mounted upon the arm 43 carries a registering mechanism as well as the above described ticket issuing mechanism, which mechanism is arranged to be actuated by the amount determining fingers 11 carried by the various destination devices.

Figure 4:
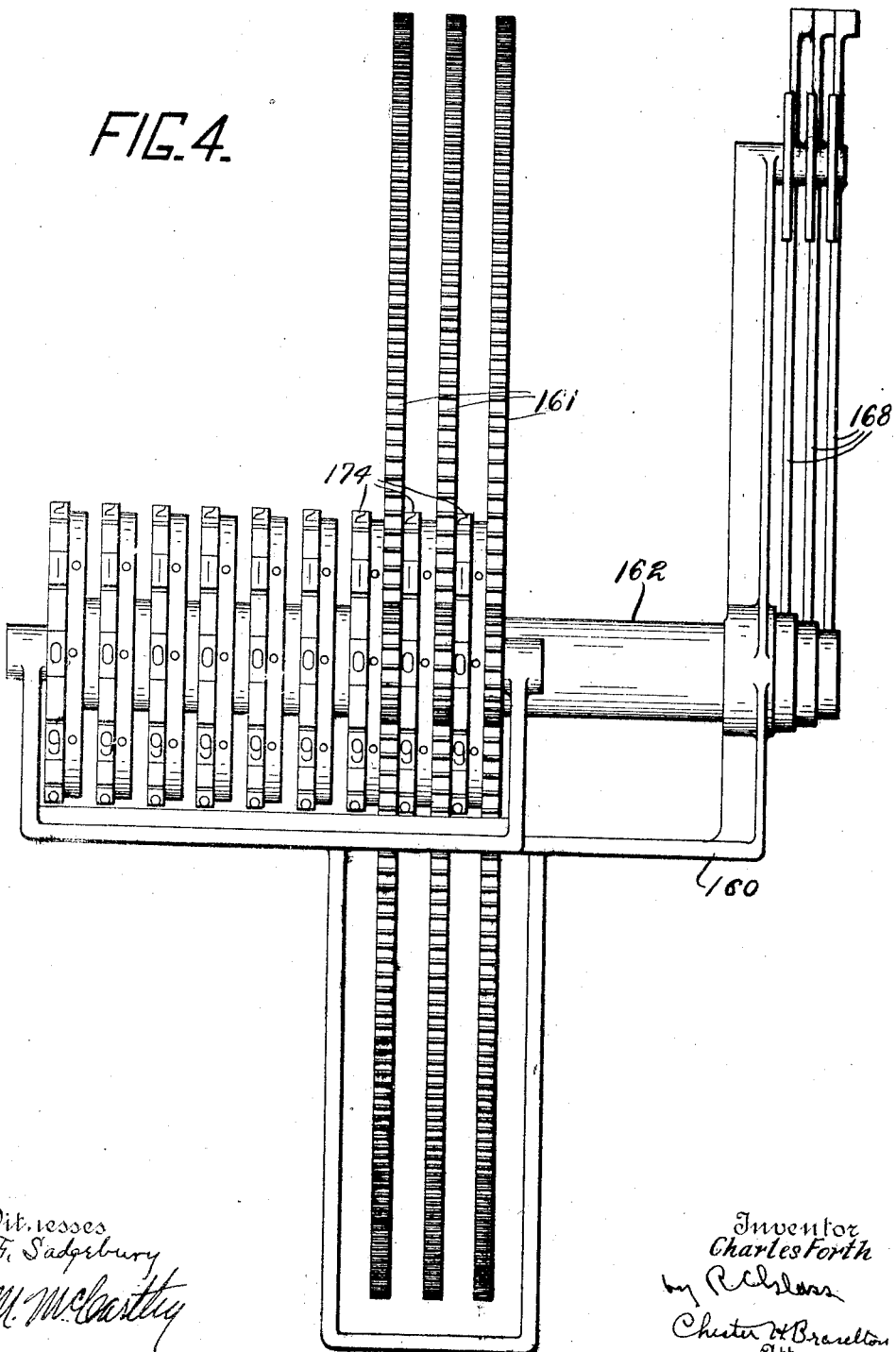
Fig. 4 is a front elevation of the registering mechanism.
Figure 5:
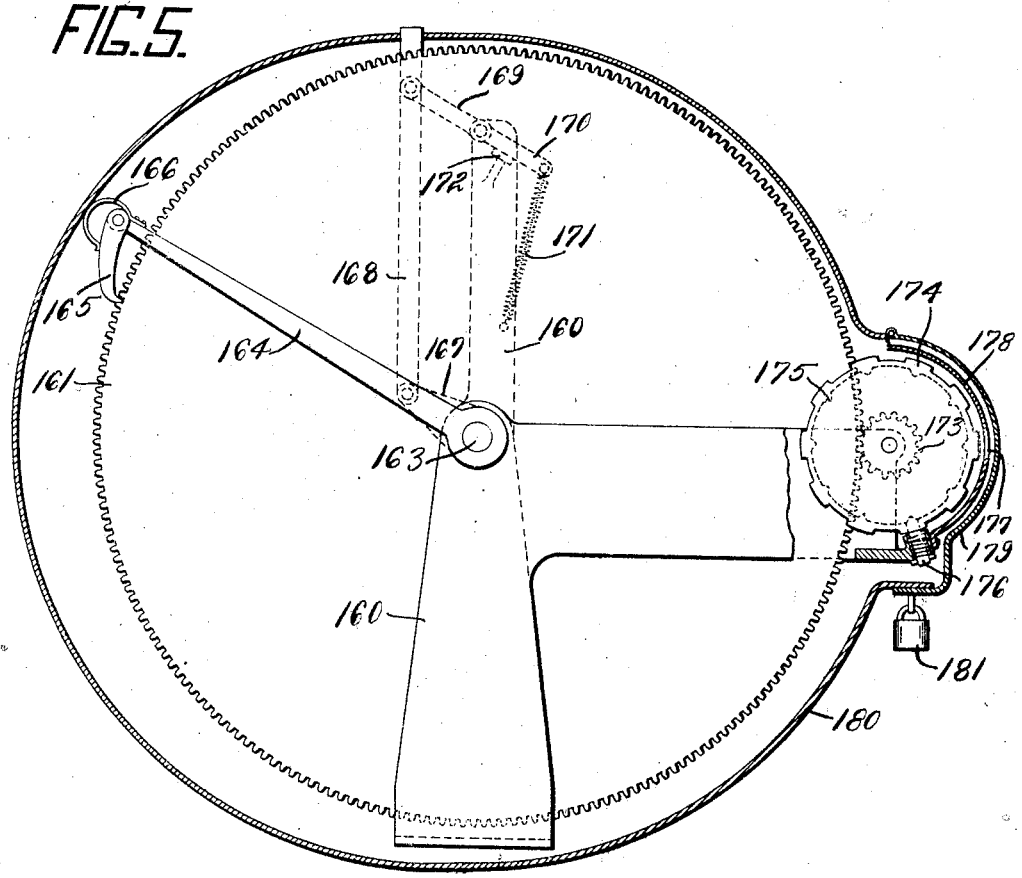
Fig. 5 is a side elevation partly in section of the registering mechanism.

A frame 160 (Figs. 2, 4 and 5) is supported by the auxiliary framework 48 and supported in this frame 160 are a plurality of gear wheels 161 which are loosely mounted upon nested sleeves 162 and a shaft 163 suitably supported in the framework 160. These sleeves 162 and shaft 163 have fast to the ends thereof adjacent the gear wheels 161 arms 164 which arms carry pawls 165 held in engagement with the gears 161 by springs 166. The other ends of these sleeves and shaft 162 and 163 have arms 167 projecting therefrom (Figs. 5 and 7), to which arms are pivoted at their lower ends rods 168, the latter near their upper ends being pivoted to arms 169 pivotally mounted upon a portion of the framework 160. These arms 169 have extensions 170 to which the ends of springs 171 are connected, the other ends of said springs being connected to a portion of the frame work. By means of these springs the arms 169 are held in contact with a lug 172 projecting from a portion of the framework 160 thereby holding the plunger rods 160 in position to be actuated by the fingers 11 of the selected destination device 5. Upon the operation of the selected destination device 5, the fingers 11 in coöperative relation with the plunger rods 168, will lower said rods to such an extent that the pawls 165 carried by the arms 164 will rotate the gears 161 an extent corresponding to the fare to the destination point represented by the operated destination device. The fingers 11, as previously stated, are graduated to represent the price of the ticket to be issued so that as an incident to printing the price and other matter from a destination device the value of the ticket will be entered on the totalizer. The destination devices shown in the drawings, are shown as being provided with three fingers 11. It is understood of course that the destination devices are each provided with as many fingers as there are denominations in the fare printed by the device, there being one finger for each denomination represented. In the illustrative form there is also shown but three actuating gears 161 but it is obvious that the number of gears depends upon the number of fingers on the destination device printing tickets of the greatest denomination. As the operated destination device is returned to its normal position, the springs 171 (Fig. 5) will return the plunger rods and actuating pawls 164 connected thereto to normal position during which movement the pawls 165 will ride idly over the gears 161. These gears 161 mesh with pinions 173 carried by elements 174 of the totalizer or registering mechanism. (Figs. 4 and 5). The flanges of the totalizer elements 174 are provided with indentations 175, with which spring operated plunger pins 176 coöperate so as to prevent accidental movement of the totalizer elements 174. Any of the well known forms of transfer mechanism between the elements of the registering mechanism may be employed to transfer from one element to another but as the particular method of transferring forms no part of this invention, such transfer devices have been omitted for the sake of clearness. The numerals upon the elements 174 of the totalizer or registering mechanism may be read through an opening 177 formed on a flange 178 partly surrounding the registering elements, which opening is normally concealed by a hinged flap 179 forming a part of the casing 180 which surround the registering mechanism. As only some person in authority, such as an auditor, is permitted to inspect the registering mechanism, the flap 179 is normally locked by lock 181, the keys of which are in possession of the auditor or some other authorized person.

In order to refresh the memory as to the mode of operation of the various parts and the functions performed thereby, a brief resume will be given of the operation of the machine.

The ticket agent having a call for a round trip ticket to Trenton, he adjusts the lever 23, Fig. 9, to the round trip position upon the plate 29, by which movement the stamps 10 of all the destination devices will be rotated so as to bring the round trip stamps of the various destination devices in position to stamp upon the ticket strip. Having thus adjusted the stamping devices to the class of fare desired, the operator takes hold of arm 42 and moves it to bring it into coöperative relation with the destination device marked "Trenton", by which movement of the arm 42 the arm 43 through the tubular shaft connections 44 will also be moved, thus bringing the ticket issuing and registering mechanism into coöperative relation, respectively, with the stamp 10 and the register actuating fingers 11. He then turns the eccentrically mounted disk 76 (Fig. 16) in a clockwise direction, by which movement the plunger frame 68 will be lowered and through plunger rod 69 partially depress the selected destination device. This turning of the disk 76 in the clockwise direction draws the link 81 (Fig. 2) forwardly and through the enlarged portion 90 formed near the end of said link close a circuit through wires 92 to the motor 53. As the armature shaft of the motor is rotated, the worm 54 thereon will drive the worm gear 55 secured to the shaft 56 in the direction of the arrow (Fig. 2) it being understood that previous to the beginning of the operation of the worm gear 55, by the worm 54, a pawl 88 is withdrawn from engagement with the arm 89 secured to the shaft 56. During the rotation of the shaft 56, the bevel gear 57 formed thereon will through the gear 58 (Figs. 2 and 7) shafts 97, gears 98, and 100 and bevel gears 101 and 102 rotate the inclined shaft 103, which shaft through the gear connections shown in Fig. 7, will rotate the feed rollers, shown in Fig. 18, to feed the ticket strip upon the platen 127 (Fig. 7) in position to be stamped by the selected destination device. By the rotation of the shaft 103, the roll 134 will be moved over the feeding rolls 118 and 120 carrying respectively an electroplate for printing desired data upon the face of the ticket and the grand total consecutive numbering device 121, inking said electroplate and numbering device and then inking the partially operated destination device. After the strip has been fed upon the platen 127 and the selected destination device inked, the ink roll 134 is withdrawn from the path of the destination device and the latter then completely operated by the rotation of the shaft 64 through the motor connection shown in Figs. 2, 16, 17 and 20. Just as the selected destination device completes its downward movement to stamp the ticket strip with the destination, class of fare and the amount of said fare to the destination and the number of times the destination device has been used, the roller 145 carried by the arm 144 will engage with the collar 146 and elevate said collar and the shaft 147 to which it is secured. This elevation of the shaft through the link 148 will rock the knife 125 (Figs. 7 and 14) so as to sever that portion of the ticket stamped by the destination device. The same data that are recorded upon the ticket strip by the lowering of the selected destination device will also through the interposed ribbon 155 be recorded upon the record strip 150 carried upon the oscillatory frame 48.

It is to be understood that in the movement of the lever 23 to select the class of fare to be stamped upon the ticket, the register actuating fingers 11, of which there are three sets, will also be adjusted so as to be brought into coöperative relation with the registering mechanism in order to register the fare to the destination represented by the used destination device. In the lowering of the selected destination device to stamp the ticket strip, these fingers 11 will engage with the plunger rods 168 (Figs. 2, 5 and 7) and cause said rods to be lowered against the tension of their springs. The lowering of these rods will, through the sleeves 162 and shaft 163, rock the arms 164 carrying the pawls 165 so as to turn the gears 161, by which turning the registering elements 164 will be rotated by said gears 161 meshing with pinions 173 carried by the registering elements 174.

From the description of the above machine, it will be seen that a simple and practical machine is provided in which tickets are issued bearing the destination, the class of fare and the number of tickets issued to such destination, which information will also be recorded upon a record strip stored within the machine and which may be removed by an authorized person. By having the above data recorded upon the record strip it is possible for the auditor at any time to check the number of tickets issued to the various destination points from the station in which the machine is located. In order to avoid possible confusion by the mixing of the removed strips the auditor in removing the record strip 150 stamps thereupon the machine number from which the strip is removed, the arm 42 being provided with a stamp for this purpose.

It will further be seen that by providing each destination device with a stamp bearing different classes of fare and also with means for controlling the entering the different classes of fares upon the registering mechanism a neat and compact machine is provided and it is intended to claim this construction broadly, whether the destination devices are moved into coöperative relation with the ticket issuing and registering mechanisms, or whether the ticket issuing and registering mechanisms are brought into coöperative relation with any one of the destination devices, as is done in the embodiment of the invention herein shown.

While the form of mechanism herein shown and described is admirably adapted to fulfill the objects primarily stated, it is to be understood that it is not intended to confine the invention to the one form of embodiment shown and described herein, as it is susceptible of embodiment in various forms, all coming within the scope of the claims which follow.

What is claimed is:—

1. In a machine of the class described, the combination with a plurality of destination devices, and a registering mechanism constructed to be positioned to be actuated by any one of said devices.

2. In a machine of the class described, the combination with a plurality of destination devices, of a registering mechanism arranged to be brought into coöperative relation with any one of the devices, and means for actuating the destination device in coöperative relation with the registering mechanism whereby the fare represented by said device will be entered upon the registering mechanism.

3. In a machine of the class described, the combination with a plurality of destination devices, of a registering mechanism arranged to be brought into coöperative relation with any one of said devices, and graduated fingers carried by each device for actuating the registering mechanism.

4. In a machine of the class described, the combination with a plurality of destination devices, of a registering mechanism actuated thereby, and means for selecting the destination device and moving the registering mechanism into coöperative relation therewith.

5. In a machine of the class described, the combination with a plurality of destination devices, each having graduated fingers, of a registering mechanism actuated by said fingers, and means for selecting the destination device for actuating the registering mechanism and for moving the latter into position to be actuated.

6. In a machine of the class described, the combination with a plurality of destination devices, of a registering mechanism actuated thereby, and means for moving the registering mechanism into coöperative relation with any desired destination device and for controlling the operation of said mechanism by the selected destination device.

7. In a machine of the class described, the combination with a plurality of destination devices, of a registering mechanism actuated thereby, and a movable frame constructed to carry the registering mechanism into coöperative relation with any one of said devices to be actuated thereby.

8. In a machine of the class described, the combination with a plurality of destination devices, of a registering mechanism actuated thereby, and a pivotal and slidable frame constructed to carry the registering mechanism into coöperative relation with any one of said devices to be actuated thereby.

9. In a machine of the class described, the combination with a plurality of destination devices, each having graduated fingers, of a registering mechanism, and a movable frame constructed to carry the registering mechanism into coöperative relation with the fingers of any one of said devices to be actuated thereby.

10. In a machine of the class described, the combination with a plurality of destination devices, each having graduated fingers, of a registering mechanism, and a pivotal and slidable frame constructed to carry the registering mechanism into coöperative relation with the fingers of any one of said devices to be actuated thereby.

11. In a machine of the class described, the combination with a frame, of a plurality of destination devices mounted therein, and a registering mechanism constructed to be positioned to be actuated by any one of said devices.

12. In a machine of the class described, the combination with a frame, of a plurality of destination devices movably mounted therein, and a registering mechanism constructed to be positioned to be actuated by any one of said devices.

13. In a machine of the class described, the combination with a frame, of a plurality of destination devices movably mounted therein, graduated fingers projecting from each of said devices, and a registering mechanism constructed to be positioned to be actuated by the fingers of any one of said devices.

14. In a machine of the class described, the combination with a frame, of a plurality of destination devices movably mounted therein, a registering mecharism, and means for positioning the registering mechanism so as to be actuated by any one of said devices.

15. In a machine of the class described, the combination with a frame, of a plurality of destination devices movably mounted therein, a registering mechanism actuated by said devices, and means for selecting the device to actuate the registering mechanism and for moving the latter into coöperative relation therewith.

16. In a machine of the class described, the combination with a frame of a plurality of destination devices movably mounted therein, graduated fingers projecting from each device, a registering mechanism, and means for moving the registering mechanism into coöperative relation with the graduated fingers of any one of said devices and then operating the selected destination device for the purpose of actuating the registering mechanism by the fingers projecting therefrom.

17. In a machine of the class described, the combination with a frame, of a plurality of destination devices movably mounted therein, a registering mechanism, means for moving the registering mechanism into coöperative relation with any one of said devices, and means carried by the moving means for actuating the selected destination device whereby the registering mechanism will be actuated.

18. In a machine of the class described, the combination with a registering mechanism, of a plurality of destination devices, each having means for controlling the entering of different classes of fares upon the registering mechanism, and mechanism for establishing coöperative relation between the registering mechanism and the fare controlling means so as to enter upon the registering mechanism any class of fare desired.

19. In a machine of the class described, the combination with a registering mechanism, of a plurality of destination devices, each having a plurality of actuating means for entering upon the registering mechanism different classes of fares, means for selecting the fare actuating means, and means for establishing coöperative relation between the selected actuating means and the registering means.

20. In a machine of the class described, the combination with a registering mechanism, of a plurality of destination devices, each having a plurality of actuating means for entering upon the registering mechanism fares of different classes, means for selecting the fare actuating means, and means for moving the registering mechanism into coöperative relation with the selected actuating means.

21. In a machine of the class described, the combination with a registering mechanism, of a plurality of destination devices, each having a plurality of actuating means for entering upon the registering mechanism fares of different classes, means for rotating the fare actuating means for the purpose of selecting the class of fare to be registered, and means for moving the registering mechanism into coöperative relation with the selected fare actuating means.

22. In a machine of the class described, the combination with a registering mechanism, of a plurality of destination devices, each having a plurality of sets of graduated fingers for entering upon the registering mechanism fares of different classes, means for selecting the set of fingers for actuating the registering mechanism, and means for moving the registering mechanism into coöperative relation with the selected actuating means.

23. In a machine of the class described, the combination with a registering mechanism, of a plurality of destination devices, each having a plurality of sets of graduated fingers for entering upon the registering mechanism fares of different classes, and means for establishing coöperative relation between the registering mechanism and any set of graduated fingers.

24. In a machine of the class described, the combination with a registering mechanism, of a plurality of destination devices, each having a plurality of sets of graduated fingers for entering upon the registering mechanism fares of different classes, means for moving the registering mechanism into coöperative relation with any one of said destination devices, and means for actuating the registering mechanism by one of the sets of graduated fingers carried by the destination device with which the destination device is in coöperative relation.

25. In a machine of the class described, the combination with a plurality of destination devices, and a movable printing mechanism comprising a record strip and a ticket strip arranged to be brought into coöperative relation with any one of the destination devices so as to have the destination of the selected device stamped upon the ticket strip and the record strip.

26. In a machine of the class described, the combination with a plurality of destination devices, of a movable printing mechanism comprising a record strip and a ticket strip arranged to be brought into coöperative relation with any one of the destination devices, and means for operating the selected device whereby the destination thereof will be stamped upon the ticket strip and the record strip.

27. In a machine of the class described, the combination with a plurality of destination devices, each having a numbering device, of a movable printing mechanism comprising a record strip and a ticket strip arranged to be brought into coöperative relation with any one of the destination devices, and means for operating the selected device whereby the destination and the number of tickets issued thereto will be stamped upon the ticket strip and the record strip.

28. In a machine of the class described, the combination with a plurality of destination devices, each having a plurality of stamps representing different classes of fares, of a ticket issuing means constructed to be brought into coöperative relation with any one of the destination devices, and means for determining the class of fare to be stamped upon the ticket by the selected destination device.

29. In a machine of the class described, the combination with a plurality of destination devices, each having a plurality of stamps representing different classes of fares, of a ticket issuing means constructed to be brought into coöperative relation with any one of the destination devices, and an adjustable lever for determining the class of fare to be stamped upon the ticket by the selected destination device.

30. In a machine of the class described, the combination with a plurality of destination devices, each having a plurality of stamps representing different classes of fares, of a ticket issuing mechanism constructed to be brought into coöperative relation with any one of the destination devices, a numbering device carried by each destination device, means for determining the class of fare to be stamped upon the ticket, and means for operating the selected destination device whereby the class of fare and number of tickets issued to the destination point will be stamped upon the ticket.

31. In a machine of the class described, the combination with a plurality of destination devices, each having a plurality of stamps representing different classes of fares, of a ticket issuing mechanism constructed to be brought into coöperative relation with any one of the destination devices, and an adjustable lever for rotating the stamps for the purpose of bringing into position any desired stamp so as to print the class of fare and the destination to which it is issued.

32. In a machine of the class described, the combination with a plurality of destination devices, each having a plurality of stamps representing different classes of fares, of a movable printing mechanism comprising a ticket strip and a record strip arranged to be moved into coöperative relation with any one of the destination devices, means for determining the class of fare to be stamped upon the ticket strip and the record strip by the selected destination device, and means for operating the latter device.

33. In a machine of the class described, the combination with a plurality of destination devices, each having a plurality of stamps representing different classes of fares, of a movable printing mechanism comprising a ticket strip and a record strip arranged to be moved into coöperative relation with any one of the destination devices, an adjustable lever for determining the class of fare to be stamped upon the ticket strip and the record strip by the selected destination device, and means for operating the latter device.

34. In a machine of the class described, the combination with a plurality of destination devices, each having a plurality of stamps representing different classes of fares, of a ticket issuing mechanism comprising feed devices for the ticket strip, means for establishing coöperative relation between the ticket issuing mechanism and any stamp of any destination devices, means for operating the latter device for the purpose of stamping the ticket strip with the class of fare and the destination to which it is issued, and means for severing the stamped portion of the ticket strip.

35. In a machine of the class described, the combination with a plurality of destination devices, each having a plurality of stamps representing different classes of fares, of a movable frame having mounted thereon a ticket strip and feed devices therefor, means for moving the frame to bring it into position to have a portion of the ticket strip fed beneath any desired destination device, means for operating the selected destination device for the purpose of stamping the ticket strip with the class of fare and the destination to which it is issued, and means for severing the stamped portion of the ticket strip.

36. In a machine of the class described, the combination with a plurality of destination devices, of a movable frame having mounted thereon a ticket strip and feed devices therefor, means for moving the frame to bring it into position to have a portion of the ticket strip fed beneath any desired destination device, means for operating the selected destination device for the purpose of stamping the ticket strip with the destination of the operated device, and means for severing the stamped portion of the ticket strip.

37. In a machine of the class described, the combination with a ticket issuing mechanism, of a plurality of destination devices, each having means for stamping different classes of fares upon the tickets, and means for establishing coöperative relation between the ticket issuing mechanism and the various destination devices.

38. In a machine of the class described, the combination with a plurality of destination devices, of a ticket issuing mechanism, means for moving the ticket issuing mechanism into coöperative relation with any desired destination device, and means for operating the selected destination device.

39. In a machine of the class described, the combination with a plurality of destination devices, of a ticket issuing mechanism, means for moving the ticket issuing mechanism into coöperative relation with any desired destination device, and means carried by the moving means for operating the selected destination devices.

40. In a machine of the class described, the combination with a plurality of destination devices, of a movable frame having mounted thereon a registering mechanism and a ticket issuing mechanism, and means for moving the frame so as to bring the registering mechanism and the ticket issuing mechanism into coöperative relation with any one of the destination devices.

41. In a machine of the class described, the combination with a plurality of destination devices, of a movable frame having mounted thereon a registering mechanism and a ticket issuing mechanism, means for moving the frame so as to bring the registering mechanism and the ticket issuing mechanism into coöperative relation with any one of the destination devices and means for operating the selected destination device whereby a ticket will be issued and the fare therefor registered.

42. In a machine of the class described, the combination with a plurality of destination devices, of a movable frame having mounted thereon a registering mechanism and a ticket issuing mechanism, means for moving the frame so as to bring the registering mechanism and the ticket issuing mechanism into coöperative relation with any one of the destination devices, and means carried by the movable frame for operating the selected destination device whereby a ticket will be issued and the fare therefor registered.

43. In a machine of the class described, the combination with a plurality of destination devices, each having a plurality of stamps representing different classes of fares and register actuating means for the different classes of fares, of a registering mechanism, a ticket issuing mechanism, and means for establishing coöperative relation between any desired stamp and register actuating means and the ticket issuing mechanism and the registering mechanism whereby upon the actuation of the destination device carrying the selected stamp and register actuation means a ticket will be issued with the destination and class of fare stamped thereon and the fare for such ticket entered upon the registering mechanism.

44. In a machine of the class described, the combination with a plurality of destination devices, each having a plurality of stamps representing different classes of fares and register actuating means for each class of fare, of a registering mechanism, a ticket issuing mechanism, and means for moving the registering and ticket issuing mechanisms into coöperative relation with any desired register actuating means and stamp whereby upon the operation of the destination device carrying the selected register actuating means and stamp a ticket will be issued with the destination and class of fare stamped thereon and the fare for such ticket entered upon the registering mechanism.

45. In a machine of the class described, the combination with a plurality of destination devices, each having a plurality of stamps representing different classes of fares and register actuating means for each class of fare, of a registering mechanism, a ticket issuing mechanism, an adjustable lever for selecting the class of fare to be stamped upon the ticket and the corresponding register actuating means, and means for moving the registering and ticket issuing mechanisms into coöperative relation with the selected register actuating means and stamp whereby upon the operation of the destination device carrying the selected register actuating means and stamp a ticket will be issued with the destination and class of fare stamped thereon and the fare for such ticket entered upon the registering mechanism.

46. In a machine of the class described, the combination with a plurality of destination devices, each having a plurality of stamps representing different classes of fares and register actuating means for each class of fare, of a registering mechanism, a ticket issuing mechanism, means for moving the registering and ticket issuing mechanisms into coöperative relation with the selected register actuating means and stamp whereby upon the operation of the destination device carrying the selected register actuating means and stamp a ticket will be issued with the destination and class of fare stamped thereon and the fare for such ticket entered upon the registering mechanism, and means carried by said moving means for operating the destination device carrying the selected stamp and register actuating means.

47. In a machine of the class described, the combination with a stationary frame having mounted therein a plurality of parallel rows of destination devices, of a pivotal and a reciprocatory frame mounted in the stationary frame, a ticket issuing mechanism carried by the movable frame, and means for maintaining the ticket issuing mechanism in the same plane as the rows of destination devices when the movable frame is rocked about its pivot to bring the ticket issuing mechanism into coöperative relation with any one of the destination devices.

48. In a machine of the class described, the combination with a stationary frame having mounted therein a plurality of parallel rows of destination devices, of a registering mechanism actuated by said devices, a pivotal and reciprocatory frame mounted in the stationary frame and carrying said registering mechanism, and means for maintaining the registering mechanism in the same plane as the rows of destination devices when the movable frame is rocked about its pivot to bring the registering mechanism into coöperative relation with any one of the destination devices.

49. In a machine of the class described, the combination with a stationary frame having mounted therein a plurality of parallel rows of destination devices, of a pivotal and reciprocatory frame mounted in the stationary frame, ticket issuing and registering mechanisms carried by the movable frame, and means for maintaining the ticket issuing and registering mechanisms in the same plane with the rows of destination devices when the movable frame is rocked about its pivot to bring the ticket issuing and registering mechanisms into coöperative relation with any one of the destination devices.

50. In a machine of the class described, the combination with a registering mechanism, of a plurality of destination devices each having means for controlling the entering of the different classes of fares on the registering mechanism.

51. In a machine of the class described, the combination with a registering mechanism, of a plurality of destination devices each having means for controlling the entering of different classes of fares upon the registering mechanism, and means common to all of said controlling means for determining the classes of fares to be entered upon the registering mechanism.

52. In a machine of the class described the combination with a registering mechanism, of a plurality of destination devices, each having a plurality of actuating means for entering upon the registering mechanism different classes of fares.

53. In a machine of the class described, the combination with a registering mechanism, of a plurality of destination devices, each having a plurality of actuating means for entering upon the registering mechanism different classes of fares, and means common to all of said actuating means for selecting the actuating means for entering upon the registering mechanism the desired class of fare.

54. In a machine of the class described, the combination with a printing mechanism, of a plurality of destination devices, each having a plurality of stamps for coöperating with the printing mechanism to print different classes of fares.

55. In a machine of the class described, the combination with a printing mechanism, of a plurality of destination devices, each having a plurality of stamps for coöperating with the printing mechanism to print different classes of fares, and means for controlling the stamps so that they will print the desired class of fare.

56. In a machine of the class described, the combination with a printing mechanism, of a plurality of destination devices, each having a plurality of stamps for coöperating with the printing mechanism to print different classes of fares, and means common to said destination devices for controlling the stamps so that they will print the desired class of fare.

57. In a machine of the class described, the combination with a plurality of destination devices arranged in a plurality of rows, of a ticket issuing mechanism movable to bring same into coöperative relation with any of the destination devices, and means for operating the device so selected to stamp upon the ticket.

58. In a machine of the class described, the combination with a stationary support, of a plurality of destination devices movably mounted in a plurality of parallel rows in said support, a ticket issuing mechanism movable to bring same into coöperative relation with any one of the destination devices, and means for moving the destination device so selected to stamp upon the ticket.

59. In a machine of the class described, the combination with a plurality of destination devices, and a registering mechanism and ticket issuing mechanism constructed to be positioned to be actuated by any one of said devices.

60. In a machine of the class described, the combination with a plurality of destination devices, of a registering mechanism and a ticket issuing mechanism arranged to be brought into coöperative relation with any one of the devices, and the means of actuating the destination device into coöperative relation with the registering mechanism and ticket issuing mechanism whereby the fare represented by said device will be entered upon the registering mechanism and printed upon the ticket issuing mechanism.

61. In a machine of the class described, the combination with a plurality of destination devices, of a registering mechanism and ticket issuing mechanism arranged to be brought into coöperative relation with any one of said devices, and graduated fingers carried by each device for actuating the registering mechanism.

62. In a machine of the class described, the combination with a plurality of destination devices, of a registering mechanism and ticket issuing mechanism actuated thereby, and means for selecting the destination device and moving the registering mechanism and ticket issuing mechanism into coöperative relation therewith.

63. In a machine of the class described, the combination with a plurality of destination devices, each having graduated fingers and printing type, of a registering mechanism actuated by said fingers and a ticket issuing mechanism receiving an impression from the said type, and means for selecting the destination device for actuating the registering mechanism and printing on the ticket issuing mechanism and for moving both of said mechanisms into position to be actuated.

64. In a machine of the class described, the combination with a plurality of destination devices, of a registering mechanism and a ticket issuing mechanism actuated thereby, and means for moving the registering mechanism and ticket issuing mechanism into coöperative relation with any desired destination device and for controlling the operation of said mechanisms by the selected destination device.

65. In a machine of the class described, the combination with a plurality of destination devices, of a registering mechanism and ticket issuing mechanism actuated thereby, and a movable frame constructed to carry the registering mechanism and ticket issuing mechanism into coöperative relation with any one of said devices to be actuated thereby.

66. In a machine of the class described, the combination with a plurality of destination devices, of a registering mechanism and ticket issuing mechanism actuated thereby, and a pivotal and slidable frame constructed to carry the registering mechanism and ticket issuing mechanism into coöperative relation with any one of said devices to be actuated thereby.

67. In a machine of the class described, the combination with a plurality of destination devices, each having graduated fingers and printing type, of a registering mechanism, and a movable frame constructed to carry the registering mechanism into coöperative relation with the fingers of any one of said devices and to carry the ticket issuing mechanism into coöperative relation with the type of said device whereby both of said mechanisms may be actuated by said device.

68. In a machine of the class described, the combination with a plurality of destination devices, each having graduated fingers and printing type, of a registering mechanism and a ticket issuing mechanism, and a pivotal and slidable frame constructed to carry the registering mechanism into coöperative relation with the fingers of any one of said devices and carry the ticket issuing mechanism into coöperative relation with the type of said devices whereby the said registering mechanism and ticket issuing mechanism are actuated by said device.

69. In a machine of the class described, the combination with a frame, of a plurality of destination devices mounted therein, and a registering mechanism and ticket issuing mechanism constructed to be positioned by actuation of any one of said devices.

70. In a machine of the class described, the combination with a frame, of a plurality of destination devices movably mounted therein, and a registering mechanism and a ticket issuing mechanism constructed to be positioned to be actuated by any one of said devices.

71. In a machine of the class described, the combination with a frame of a plurality of destination devices movably mounted therein, a registering mechanism and a ticket issuing mechanism actuated by said devices, and means for selecting the device to actuate the registering mechanism and ticket issuing mechanism and for moving the latter mechanisms into coöperative relation therewith.

72. In a machine of the class described, the combination with a frame, of a plurality of destination devices movably mounted therein, graduated fingers projecting from each device, printing type carried by said destination devices, a registering mechanism and a ticket issuing mechanism, and means for moving the registering mechanism into coöperative relation with the graduated fingers of any one of said devices and then operating the selected destination device for the purpose of actuating the registering mechanism by the fingers projecting therefrom, and for moving the ticket issuing mechanism into coöperative relation with the type of said destination device and then operating the selected destination device for making an impression with the type thereof on the ticket issuing mechanism.

In testimony whereof I affix my signature in the presence of two witnesses.

CHARLES FORTH.

Witnesses:
 CHESTER H. BRASELTON,
 WILLIAM AFFLECH.